United States Patent
Tseng (10) Patent No.: US 7,279,877 B1
(45) Date of Patent: Oct. 9, 2007

(54) ADAPTIVE CURRENT REVERSAL COMPARATOR

(75) Inventor: Jaime Tseng, Saratoga, CA (US)

(73) Assignee: Linear Technology Corp., Milpitas, CA (US)

( * ) Notice: Subject to any disclaimer, the term of this patent is extended or adjusted under 35 U.S.C. 154(b) by 0 days.

(21) Appl. No.: 11/408,749

(22) Filed: Apr. 21, 2006

(51) Int. Cl.
G05F 1/40 (2006.01)

(52) U.S. Cl. .................. 323/284; 323/225; 323/285; 363/127

(58) Field of Classification Search ............. 323/222, 323/225, 282, 283, 284, 285, 351; 363/125, 363/127
See application file for complete search history.

(56) References Cited

U.S. PATENT DOCUMENTS

| | | | |
|---|---|---|---|
| 3,458,798 A | 7/1969 | Fang et al. | |
| 3,579,091 A | 5/1971 | Clarke et al. | |
| 3,582,758 A | 6/1971 | Gunn | |
| 3,784,893 A | 1/1974 | Rando | |
| 3,992,638 A | 11/1976 | Sauvanet | |
| 4,462,069 A | 7/1984 | Becky | |
| 4,672,303 A | 6/1987 | Newton | |
| 4,683,529 A | 7/1987 | Bucher, II | |
| 4,712,169 A | 12/1987 | Albach | |
| 4,922,404 A | 5/1990 | Ludwig et al. | |
| 6,310,469 B1 * | 10/2001 | Bentolila et al. | 323/283 |
| 6,580,258 B2 | 6/2003 | Wilcox et al. | |
| 6,998,828 B2 * | 2/2006 | Casey et al. | 323/284 |
| 7,030,596 B1 * | 4/2006 | Salerno et al. | 323/282 |

FOREIGN PATENT DOCUMENTS

| | | |
|---|---|---|
| EP | 0 428 277 A2 | 5/1991 |
| JP | 63-307510 | 12/1988 |
| JP | 4-49844 | 2/1992 |
| JP | 4-101286 | 9/1992 |

OTHER PUBLICATIONS

Written Interlocutory Decision from the Opposition Division dated Dec. 23, 2002, Application No. 94104509.8.
Archer, William R., "Current Drives Synchronous Rectifier," EDN, p. 279, Nov. 28, 1985.
Archer, William R., "Current-Driven Synchronous Rectifier," Motorola TMOS Power FET Design Ideas, BR316, pp. 9-10, 1985, (no month).

(Continued)

Primary Examiner—Jessica Han
(74) Attorney, Agent, or Firm—McDermott Will & Emery LLP (57) ABSTRACT

An adaptive current reversal comparator for synchronous switching regulator comparison circuit for use in a switching regulator is provided. The comparison circuit includes a voltage offset that is used at least in part to compensate for a propagation delay of the comparison circuit. The switching regulator includes an inductor and a synchronous transistor. The comparison circuit also includes a timing circuit that provides a threshold amount of time and an offset adjustment circuit. The offset adjustment circuit preferably decreases the voltage offset of the comparison circuit when a synchronous transistor control signal transitions to an OFF state more than the threshold amount of time prior to the discharge of an inductor. The comparison circuit also increases the voltage offset of the comparison circuit when the synchronous control signal transitions to an OFF state more than the threshold amount of time following the discharge of the inductor.

19 Claims, 8 Drawing Sheets

OTHER PUBLICATIONS

Blanchard, Richard, et al., "MOSFETs, Schottky Diodes Vie for Low-Voltage-Supply Designs," EDN, p. 197, Jun. 28, 1984.
Borghi et al., "Discontinuous Conduction Mode Power Switching Regulator IC," PCI Oct. 1988 Proceedings, pp. 31-41, Oct. 1988.
Brown, Marty, "Pratical Switching Power Supply Design," pp. 20-34, Academic Press, Inc., 1990.
Fisher, R. A. et al., "Performance of Low Loss Synchronous Rectifiers in a Series-Parallel Resonant DC-DC Converter," Proceedings of the Fourth Annual IEEE Applied Power Electronics Conference and Exposition, pp. 240-246, Mar. 1989.
Gauen, Kim, "Synchronous Rectifier Improves Step-Down Converter Efficiency," PCIM, pp. 8, 11-12 & 14-15, Apr. 1993.
Grant, Duncan A. et al., "Power Mosfets, Theory and Application," pp. 239-256, Wiley-Interscience, 1989, (no month).
Hnatek, Eugene R., "Design of Solid State Power Supplies," Third Edition, pp. 65-70, Van Nostrand Reinhold, 1989, (no month).
International Rectifier, "IR Application Note AN-978, HV Floating MOS Gate Driver ICs, Full Bridge With Current Mode Control," Application Note from web page, Date Uknown, (no date).
Maxim Integrated Products, Inc., "MAX746 High-Efficiency, PWM, Step-Down, N-Channel DC-DC Controller," Datasheet, Nov. 1993.
Maxim Integrated Products, Inc., "MAX747 High-Efficiency PWM, Step-Down P-Channel DC-DC Controller," Datasheet, Sep. 1993.
Maxim Integrated Products, Inc., "MAX783 Triple-Output Power-Supply Controller for Notebook Computers," Datasheet, May 1994.
Micro Linear Corporation, "ML4862 Battery Power Control IC," Datasheet, Mar. 1997.
Siliconix, "Designing DC/DC Converters with the Si9110 Switchmode Controller," Siliconix Power Products Data Book, 1991, (no month).
Williams, J., "Clever techniques improve thermocouple measurements," EDN, May 26, 1988.
Micro Linear Corporation, "ML4861 Low Voltage Boost Regualtor," Preliminary Datasheet, Jul. 1992.
Unitrode's First Amended Answer to Amended Complaint for Patent Infringement, (no date).
Linear Technology Coporation's Reply and Counterclaims to Unitrode's First Amended Answer to LTC's Amended Complaint, (no date).
Order dated Sep. 21, 2001, Linear Technology Corporation v. Impala Linear Corporation, No. C-98-1727 VRW (N.D. Cal.).
Claim Construction Order dated Jun. 9, 1999, Linear Technology Corporation v. Impala Linear Corporation, No. C 98-1727 EMS (N.D. Cal.).
Preliminary opinion from the Opposition Division dated Jul. 16, 2002, Application No. 94104509.8)(with Summons).

* cited by examiner

ADAPTIVE CURRENT REVERSAL COMPARATOR

BACKGROUND OF THE INVENTION

This invention relates to voltage regulators. More specifically this invention relates to switching regulators with synchronous rectification.

A synchronous switching regulator typically includes a first transistor that is ON during a first portion of a switching cycle and a second transistor that is ON during a second portion of the switching cycle. During the first portion of the switching cycle, the first transistor conducts between a power supply and an inductor. The second transistor is typically OFF during the first portion of the cycle. In the first portion of the cycle, power is transmitted from the power supply through the first transistor to the inductor (which in turn is typically coupled to a load and/or load capacitor). During a second portion of the cycle, the second transistor, which may be referred to herein as the synchronous transistor, turns ON and couples ground (or some other suitable reference voltage) to the end of the inductor that is not coupled to the load. In certain parts of the switching cycle, both transistors may be OFF and the end of the inductor not coupled to the load may, in fact, be floating.

Switching regulators with synchronous rectification preferably require a comparator, or for the purposes of this application other suitable comparison circuit, that monitors current reversal across the synchronous transistor. An ideal comparator with zero propagation delay would simply trip— i.e., change from a first output state to a second output state—when a sign reversal is detected across the synchronous transistor. The output of the comparator is used to control the operation of the second transistor.

However, real comparators must offset the trip point to compensate for the propagation delays associated with the current reversal in the output inductor. The offset required depends on the propagation delay of the comparator and the time the inductor current takes to reach zero from the trip point. These two factors typically depend on the output voltage of the regulator and the inductor value used, both of which are typically beyond the IC (integrated circuit) designer's control. The current state of the art is to select the most likely output voltage and its corresponding inductor value, and then calculate the offset voltage the comparator needs. This approach works reasonably well for many applications. But for some applications the comparator either trips too early or too late, resulting in lowered efficiency.

It would be desirable to provide current reversal comparison circuits and methods that automatically adjusts for any suitable output voltage and/or inductor value.

SUMMARY OF THE INVENTION

It is an object of the invention to provide current reversal comparison circuits and methods that are automatically adjustable for any suitable output voltage and/or inductor value.

A method of providing power to a load using a synchronous switching regulator according to one embodiment of the invention is provided. The synchronous switching regulator includes a power supply, a main transistor that typically operates as a switch, a synchronous transistor, and an inductor having one side coupled to the load.

The method preferably includes turning ON a first transistor during a first portion of a switching cycle. The first transistor is preferably coupled to a second side of the inductor, the first transistor that conducts between the power supply and the inductor during the first portion of the switching cycle. The method also preferably includes turning ON a second transistor that is ON during a second portion of the switching cycle and that is OFF during the remainder of the switching cycle, the second transistor that is also coupled to the second side of the inductor. The second transistor conducts between ground and the inductor during the second portion of the switching cycle.

The method also includes detecting a trip point at which the voltage at the second side of the inductor is about zero, the detecting using a comparison circuit, determining a time differential between the trip point and an end of the second portion of the switching cycle, and, finally adjusting an offset of the comparison circuit in response to the time differential.

BRIEF DESCRIPTION OF THE DRAWINGS

The following detailed description of the embodiments of the present disclosure can best be understood when read in conjunction with the following drawings, in which the features are not necessarily drawn to scale but rather are drawn as to best illustrate the pertinent features, wherein.

DESCRIPTION OF INVENTION

In the present invention, the offset of the current reversal comparator is preferably automatically adjusted for any suitable output voltage and inductor value. The adaptive current reversal comparator ensures the synchronous transistor is substantially always turned OFF at about zero inductor current—i.e., about the point of current reversal in the secondary switch.

In synchronous regulators, the current reversal comparator is active preferably only in discontinuous conduction mode (DCM). The current reversal comparator prevents inductor current reversal by turning OFF the synchronous transistor thereby mimicking a rectifying diode to prevent the backflow of current through the inductor. In continuous conduction mode (CCM), the current reversal comparator is inactive, since the inductor current, by definition, does not reverse.

In convention implementations of DCM circuitry, the synchronous transistor can either turn OFF too early or turn OFF too late. When it turns OFF too early, the stored energy left in the inductor pulls the SW pin 114 below ground, until the internal body diode of the synchronous transistor conducts the necessary current and clamps the transistor pin at −0.7 volts. Typically, conducting through the body diode results in a reduction of efficiency because it is more efficient to conduct through the channel of the synchronous transistor than it is to conduct through the body diode of the synchronous transistor. When the synchronous transistor turns OFF too late, the reverse stored energy in the inductor pushes SW pin 114 HIGH right after the synchronous transistor is turned OFF.

The adaptive current reversal comparator according to the invention takes advantage of these differences and servos its offset voltage such that the synchronous transistor is preferably turned OFF within a predetermined window of the discharge point of the inductor (wherein the inductor is substantially completely discharged)—i.e., the point of current reversal in the synchronous transistor. In other words, the offset voltage of the adaptive current reversal comparator, which controls where the comparator actually trips as opposed to where it should trip, is servoed such that the comparator (which responds to the discharge point of the inductor) substantially always trips within a certain predetermined time of the tripping of the synchronous transistor.

Circuit Implementation

Figure 1:
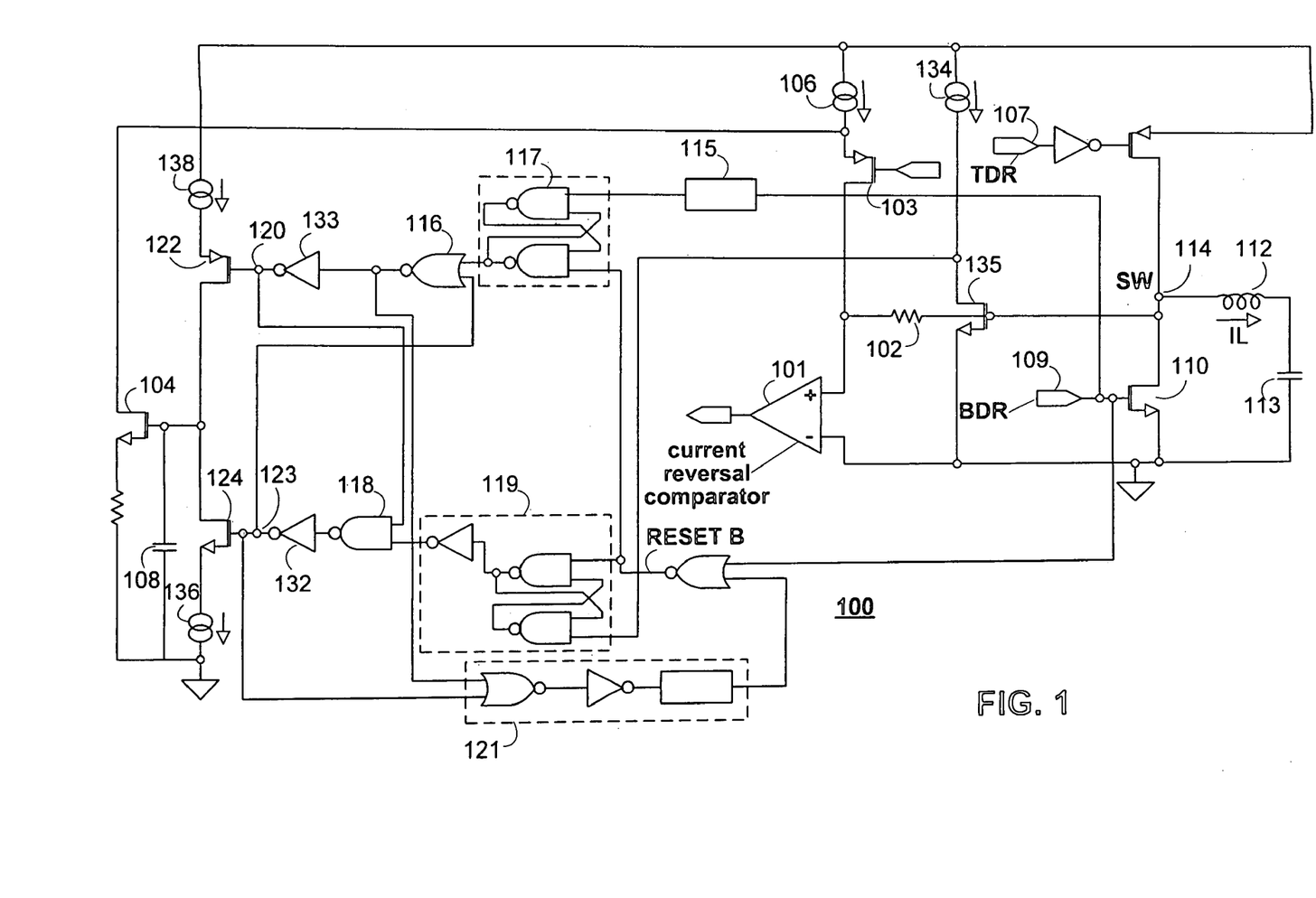
FIG. 1 is a synchronous switching regulator according to the invention.

FIG. 1 shows the circuit implementation 100 of the adaptive current reversal comparator (RCMP) 101. The offset of RCMP 101 is developed by a current dropped across resistor 102 (which is the offset resistor coupled to the gate of transistor 135 and which receives a constant current from current source 106.) This current is modulated by transistor 104 to servo the offset voltage as needed. Transistor 104 is adapted to steer current away from a constant current source 106 as necessary. Thus, the offset voltage can range from zero volts to a maximum of the current through source 106× the resistance of resistor 102. Transistor 103 preferably provides level shifting to allow the current steering to be implemented.

Charging and discharging capacitor 108 modulates the RCMP offset voltage. To increase the offset voltage, capacitor 108 is discharged, and conversely to decrease the offset voltage, capacitor 108 is charged.

Alternatively, the implementation of the comparator offset servo loop could just as well be implemented with a digital counter (not shown) or a digital-to-analog converter (DAC) (also not shown) instead of using capacitor 108.

TDR 107 is typically controlled by an input from an oscillator. In DCM, BDR is controlled by the output of current reversal comparator 101.

Figure 2:
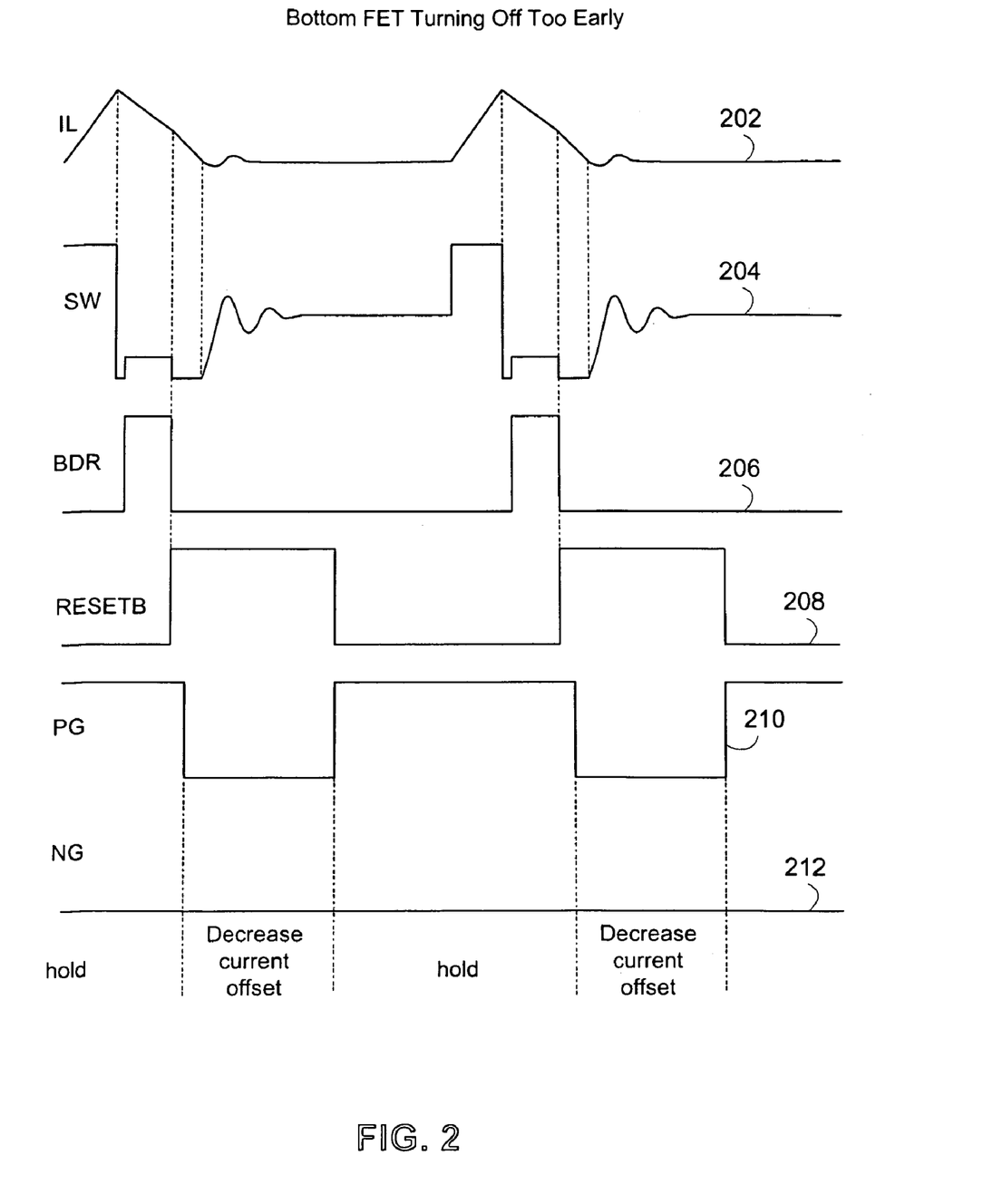
FIG. 2 is a group of signal traces based on the circuit shown in FIG. 1.

In the case when the synchronous FET (NFET), transistor 110, is turned OFF too early by BDR 109, the RCMP offset voltage should preferably be decreased. (See FIG. 2, which includes trace 202 representing IL, the current through the inductor, trace 204 which represents the SW pin 114 that is coupled to inductor 112, trace 206 which represents BDR 109 input, trace 208 which represents RESETB which is input to latches 117 and 119, trace 210 PG, which shows implementation of the decrease of the offset voltage.[1] The stored energy left in inductor 112 pushes SW pin 114 (which is located at the second end of the inductor) below ground right after BDR 109 goes LOW. Some time after the inductor current has discharged SW pin 114 swings HIGH and settles to the output voltage (VOUT). The time it takes BDR 109 (which responds to current reversal in transistor 110 as stated above) to go LOW and SW 114 to go HIGH is compared against a 20 nanoseconds delayed BDR signal 115 (which is coupled to receive an input from BDR 109). If the time differential between BDR 109 going LOW and SW 114 going ---
[1] Trace 212 does not oscillate in FIG. 2 but its equivalent trace 312 in FIG. 3 does oscillate. Trace 312 NG implements the increase of the offset voltage (see FIG. 3) wherein the BDR trace 306 shows BDR 109 forcing transistor 110 LOW after inductor 112, carrying IL 202, has fully discharged and reversed polarity. HIGH is greater than 20 nanoseconds, NOR gate 116 and NAND gate 118 preferably latch (which are implemented via logic 117 and 119, respectively, and that have outputs that are inverted using inverters 133 and 132, respectively), and drive PG 120 (coupled to the gate of transistor 122, transistor 122 having a source coupled to constant current source 138) LOW, thereby charging capacitor 108 (see trace 210 in FIG. 2). Block 121 preferably provides a delay of some predetermined amount—e.g., 70 nanoseconds—to allow transistor 104 to charge up sufficiently so as to be able to influence the operation of current reversal comparator 101.

Figure 3:
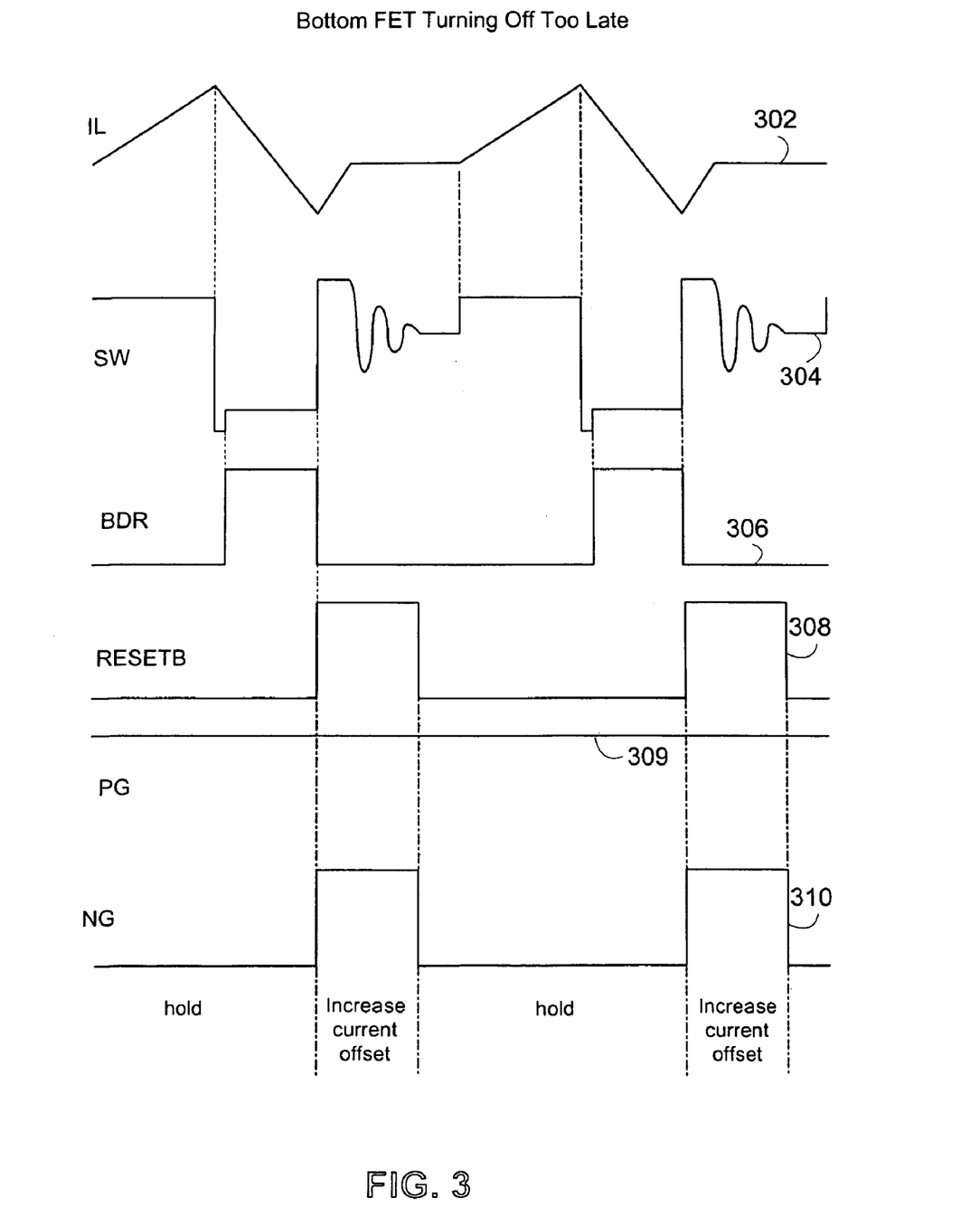
FIG. 3 is a second group of signal traces based on the circuit in FIG. 1.

In the situation when transistor 110 is turned OFF too late, SW pin 114 swings HIGH immediately after BDR 109 goes LOW. In this case gate 116 and gate 118 latch in the opposite state, and drive NG 123 (which is coupled to the gate of transistor 124 which itself is preferably coupled to constant current sink 136) is HIGH thereby discharging capacitor 108 (see trace 310 in FIG. 3). FIG. 3 includes trace 302 representing IL, the current through the inductor, trace 304 which represents the pin voltage at SW pin 114, trace 306 which represents BDR 109 input, trace 308 which represents RESETB which is input to latches 117 and 119, trace 309 PG (which is flat under the conditions shown in FIG. 3), and trace 310 which shows NG implementing the increase of the offset voltage.

CCM at High Load and CCM at Low Load

Figure 5:
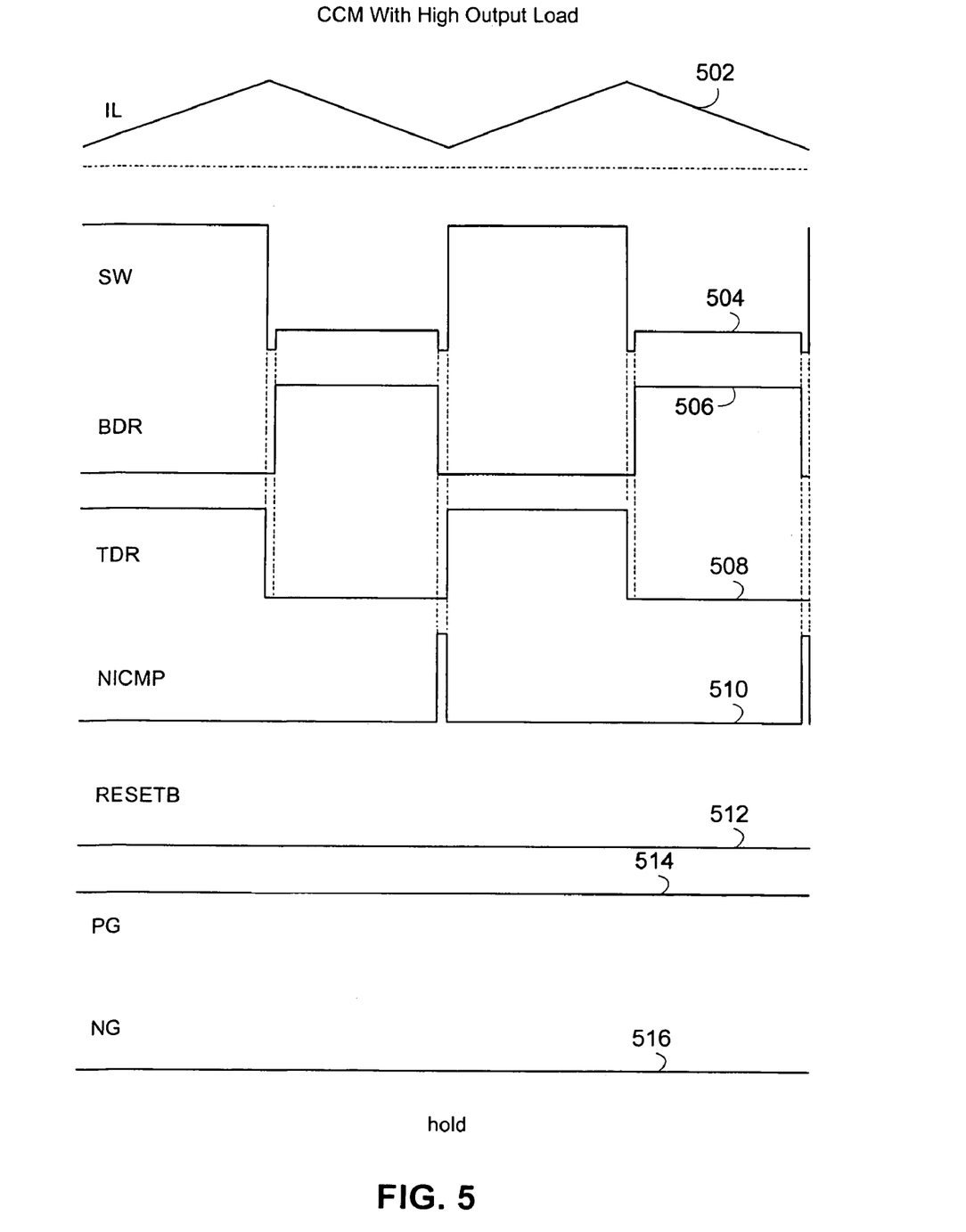
FIG. 5 is a group of signal traces based on the circuit in FIG. 4.

Additional circuitry may be needed to recognize and/or distinguish the situation where the regulator is running in CCM at relatively HIGH output load current, and CCM at relatively LOW output load current. In CCM at HIGH output load current (the traces for which are shown in FIG. 5), the inductor current does not reverse—i.e., the inductor current is typically above a certain threshold value. Thus, circuitry is preferably only needed to prevent capacitor 108 from charging or discharging—i.e., circuitry that maintains capacitor 108 at a preferably predetermined independent value.

Figure 6:
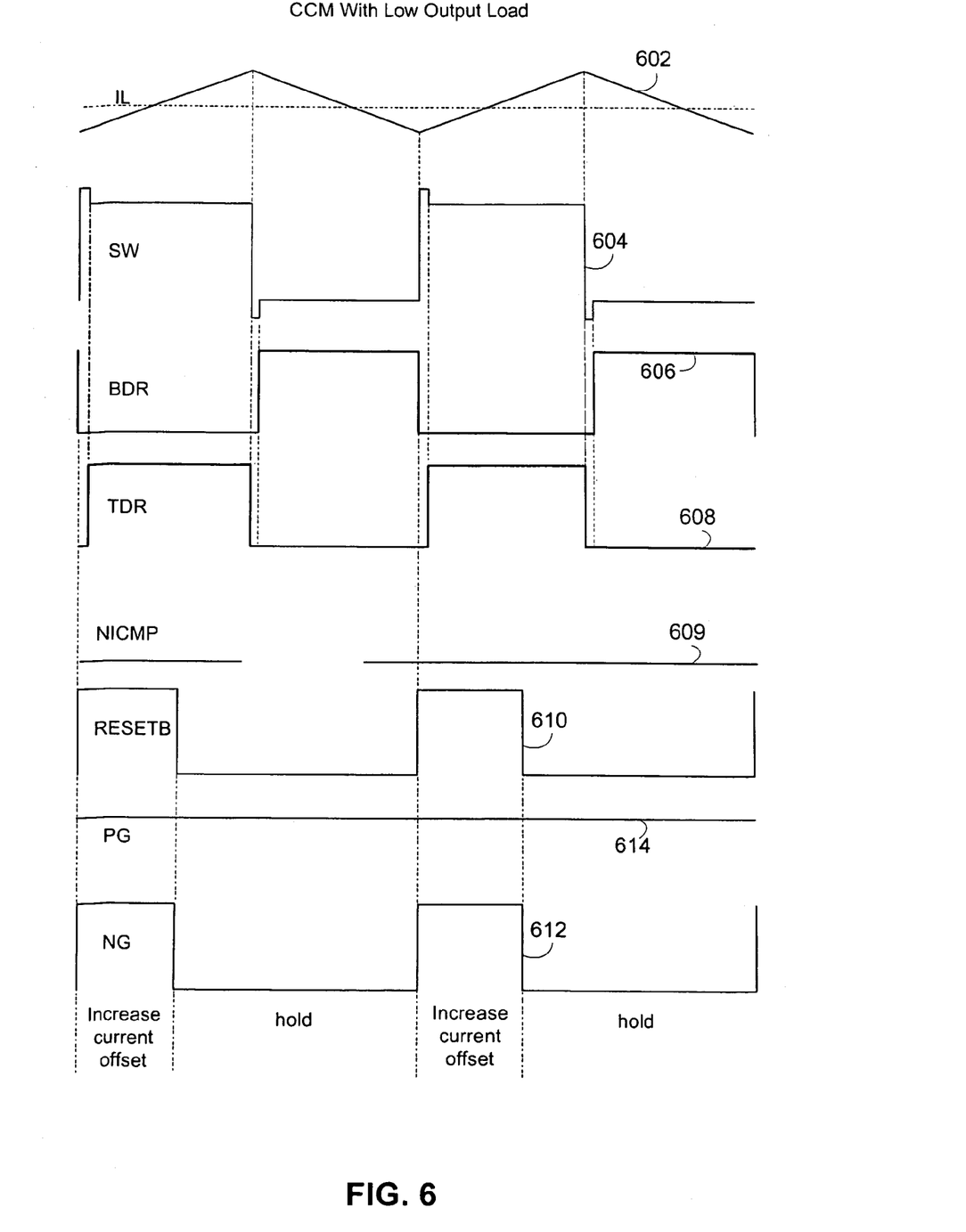
FIG. 6 is a second group of signal traces based on the circuit shown in FIG. 4.
Figure 7:
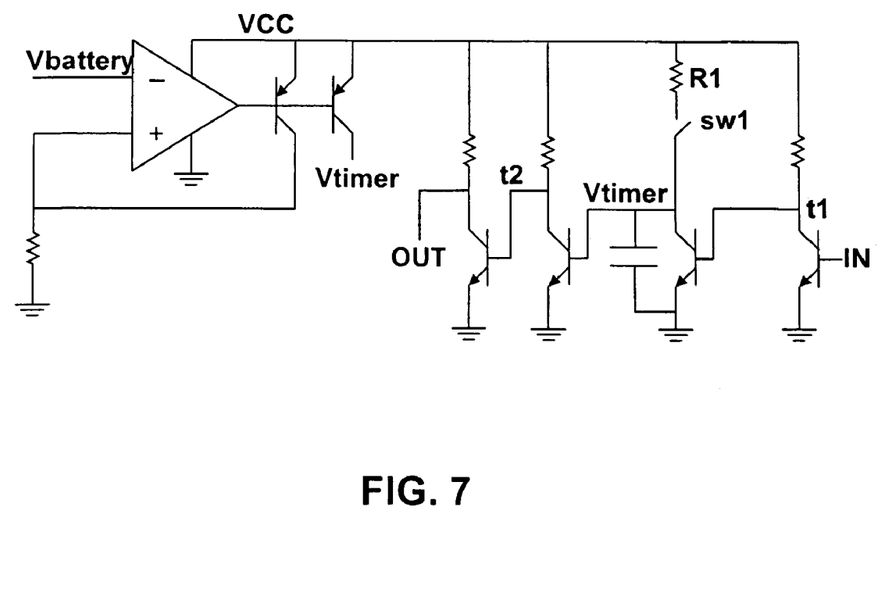
FIG. 7 is a delay circuit.
Figure 8:
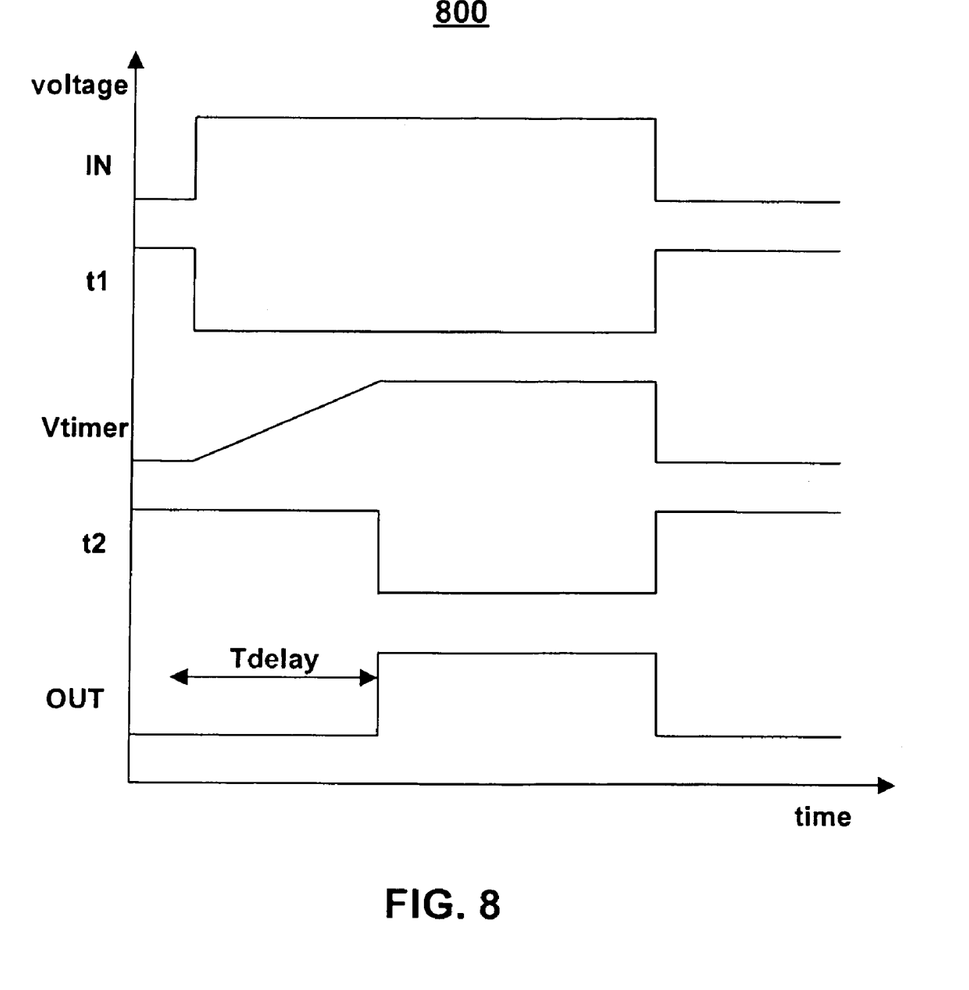
FIG. 8 is a group of signal traces based on the circuit shown in FIG. 7.

In CCM at LOW output load current (the traces for which are shown in FIG. 6), the regulator may be running in forced continuous mode and the inductor current may reverse. In this case, capacitor 108 needs to discharge to raise the RCMP offset voltage.

Figure 4:
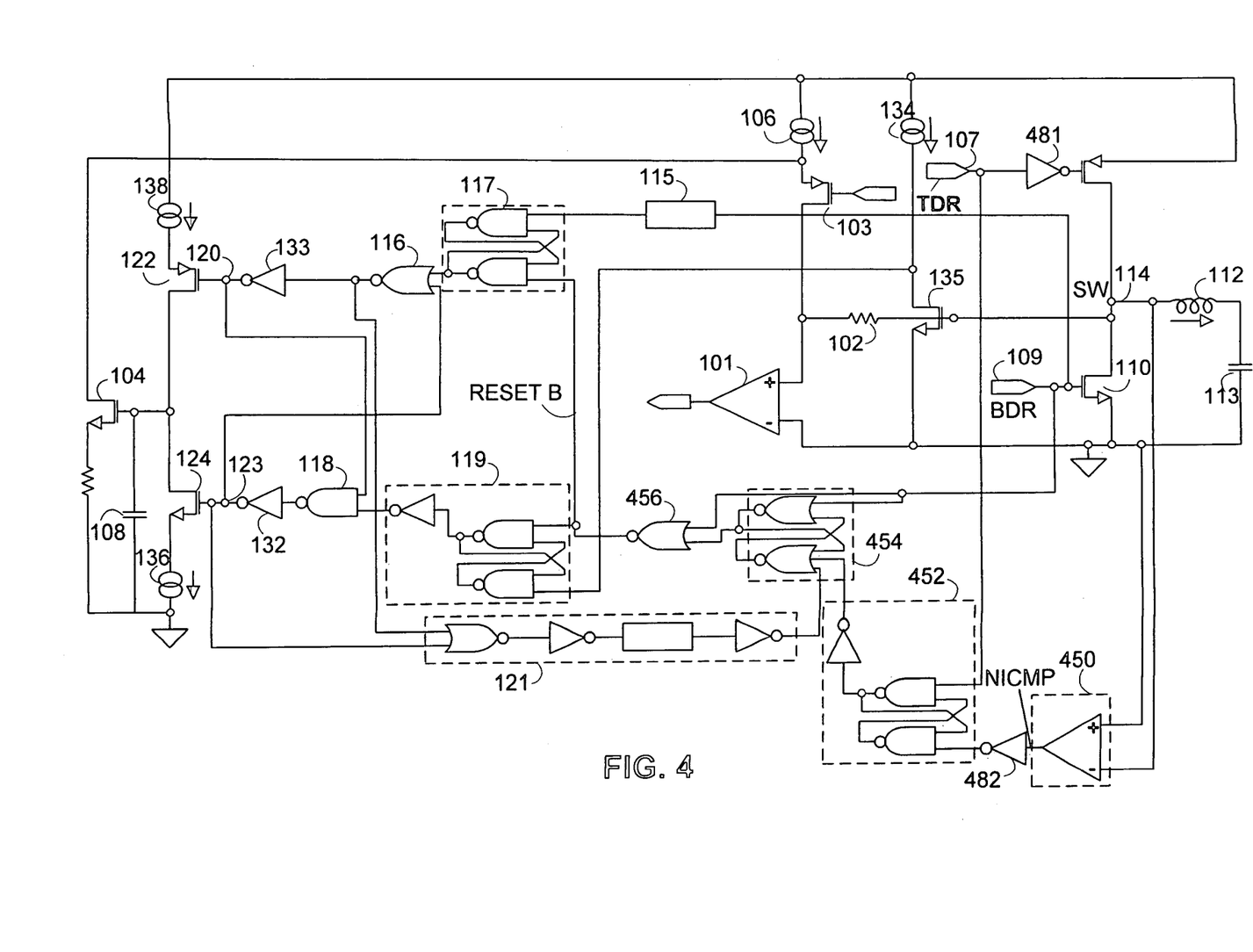
FIG. 4 is a second synchronous switching regulator according to the invention.

FIG. 4 shows additional circuitry. This additional circuitry preferably distinguishes CCM at HIGH output load current from CCM at LOW output load current (and, preferably, both conditions from DCM mode). To distinguish CCM at HIGH output load current from CCM at LOW output load current, NICMP comparison circuit 450 is used to detect whether SW pin 114 dips below ground or not. In the case of CCM at HIGH output load current, SW pin 114 dips below ground immediately following the falling edge of BDR 109 and circuit 450 goes HIGH. (See FIG. 5 wherein trace 502 shows the inductor current IL 112, trace 504 shows SW pin 114, trace 506 shows BDR 109, trace 508 shows TDR 107, and trace 510 shows circuit 450.) In CCM at HIGH output load current, circuit 450 resets latch 452, which also is coupled to receive an input from TDR 107, allows TDR 107 through latch 454 and gate 456 to pull RESETB LOW (see trace 512), keeping both PG 120 HIGH and NG 123 LOW (see traces 514 and 516). Keeping PG 120 HIGH and NG 123 LOW maintains the offset voltage independent of oscillation of IL 502 at preferably more than a predetermined threshold.

In the case of CCM at LOW output load current, SW pin 114 does not dip below ground immediately following the falling edge of BDR 109 and circuit 450 stays LOW. (See FIG. 6 wherein trace 602 shows inductor current 112, trace 604 shows SW pin 114, trace 606 shows BDR 109, trace 608 shows TDR 107, trace 609 shows NICMP, trace 610 shows RESETB, trace 612 shows NG 123, and trace 614 shows PG 120.) In this situation, latch 452 preferably does not reset which prevents TDR 107 from going through latch 454. This results in a circuit that behaves substantially identically to the circuit in FIG. 1. capacitor 108 is allowed to charge or discharge—i.e., is flexible—as needed to prevent the inductor current from reversing. Inverter 481 and 482 invert the signals at the outputs of TDR 107 and 450 respectively.

The embodiments described hereinabove are further intended to explain best modes known of practicing the invention and to enable others skilled in the art to utilize the invention in such, or other, embodiments and with the various modifications required by the particular applications or uses of the invention. Accordingly, the description is not intended to limit the invention to the form disclosed herein. Also, it is intended that the appended claims be construed to include alternative embodiments.

What is claimed is:

1. A method for adjusting the offset of a synchronous switching regulator comparison circuit, the synchronous switching regulator comparison circuit for use in a switching regulator, the comparison circuit comprising a voltage offset that is used at least in part to compensate for a propagation delay of the comparison circuit, the switching regulator comprising an inductor and a synchronous transistor, the operation of the synchronous transistor controlled by a synchronous transistor control signal, the method comprising:
    comparing the synchronous transistor control signal with the discharge of the inductor;
    when the synchronous transistor control signal transitions to an OFF state more than a threshold amount of time prior to the discharge of the inductor, decreasing the offset of the synchronous switching regulator comparison circuit; and
    when the synchronous control signal transitions to an OFF state more than a threshold amount of time after the discharge of the inductor, increasing the offset.

2. The method of claim 1 further comprising determining whether the synchronous transistor control signal transitions to an OFF state more than a threshold amount of time prior to the discharge of the inductor.

3. The method of claim 1 further comprising determining whether the switching regulator is operating in discontinuous conduction mode or continuous conduction mode.

4. The method of claim 1 further comprising determining whether the switching regulator is operating in a continuous conduction mode at a light output current load characterized by a transistor pin that does not drop below ground.

5. The method of claim 1 further comprising determining whether the switching regulator is operating in a continuous conduction mode at a relatively heavy output current mode characterized by a pin coupled to the synchronous transistor that periodically drops below ground.

6. A synchronous switching regulator comparison circuit for use in a switching regulator, the comparison circuit comprising a voltage offset that is used at least in part to compensate for a propagation delay of the comparison circuit, the switching regulator comprising an inductor and a synchronous transistor, the comparison circuit comprising:
    a timing circuit that provides a threshold amount of time; and
    an offset adjustment circuit that decreases the voltage offset of the comparison circuit when a synchronous transistor control signal transitions to an OFF state more than the threshold amount of time prior to the discharge of an inductor and increases the voltage offset of the comparison circuit when the synchronous transistor control signal transitions to an OFF state more than the threshold amount of time following the discharge of the inductor.

7. The comparison circuit of claim 6 further comprising a delay circuit that provides a delay that corresponds to the threshold amount of time.

8. The comparison circuit of claim 6 further comprising a logic circuit that determines whether the switching regulator is operating in discontinuous conduction mode or continuous conduction mode.

9. The comparison circuit of claim 6 further comprising a logic circuit that determines whether the switching regulator is operating in a continuous conduction mode at a light output current load characterized by a synchronous transistor pin that does not drop below reference voltage level.

10. The comparison circuit of claim 6 further comprising a logic circuit that determines whether the switching regulator is operating in a continuous conduction mode at a heavy output current mode characterized by a synchronous transistor pin that periodically drops below a reference voltage level.

11. A synchronous switching regulator comprising:
    a power supply;
    an inductor having a first side coupled to a load;
    a first transistor that is ON during a first portion of a switching cycle, the first transistor coupled to a second side of the inductor;
    a second transistor that is ON during a second portion of the switching cycle and that is OFF during the remainder of the switching cycle, the second transistor that is coupled to the second side of the inductor;
    the first transistor that conducts between the power supply and the load during the first portion of the switching cycle;
    the second transistor that conducts between ground and the inductor during the second portion of the switching cycle;
    a synchronous switching regulator comparator circuit that detects a trip point at which the voltage at the second side of the inductor is about zero;
    a measurement circuit that determines a time differential between the trip point and an end of the second portion of the switching cycle; and
    an offset adjustment circuit that adjusts an offset of the comparison circuit in response to a determination of the measurement circuit, the offset of the comparison circuit that controls a magnitude of the time difference between the total discharge of the inductor and the trip point of the comparator circuit.

12. The switching regulator of claim 11 further comprising a differentiation circuit that determines whether the switching regulator is operating in a continuous conduction mode characterized by zero current reversals or operating in a continuous conduction mode characterized by periodic current reversals.

13. The switching regulator of claim 11, the offset adjustment circuit further operable to decrease the offset of the comparison circuit when the measurement circuit determines that the trip point occurs more than a predetermined amount of time before the end of the second portion of the switching cycle.

14. The switching regulator of claim 11, the offset adjustment circuit further operable to increase the offset of the comparison circuit when the measurement circuit determines that the trip point occurs more than a predetermined amount of time after the end of the second portion of the switching cycle.

15. A method of providing power to a load using a synchronous switching regulator, the synchronous switching regulator comprising a first transistor, a synchronous transistor, a power supply and an inductor having a first side coupled to a load, the method comprising:
- turning ON the first transistor during a first portion of a switching cycle, the first transistor coupled to a second side of the inductor, the first transistor that conducts between the power supply and the inductor during the first portion of the switching cycle;
- turning ON a second transistor, the second transistor that is ON during a second portion of the switching cycle and that is OFF during the remainder of the switching cycle, the second transistor that is coupled to the second side of the inductor, the second transistor that conducts between ground and the inductor during the second portion of the switching cycle;
- detecting a trip point at which the voltage at the second side of the inductor is about zero, the detecting using a comparison circuit;
- determining a time differential between the trip point and an end of the second portion of the switching cycle; and
- adjusting an offset of the comparison circuit in response to the time differential.

16. The method of claim 15 further comprising determining whether the switching regulator is operating in a continuous conduction mode characterized by zero current reversals or operating in a continuous conduction mode characterized by periodic current reversals.

17. The method of claim 15, further comprising decreasing the offset of the comparison circuit when the trip point occurs more than a predetermined amount of time before the end of the second portion of the switching cycle.

18. The method of claim 15, further comprising increasing the offset of the comparison circuit when the trip point occurs more than a predetermined amount of time after the end of the second portion of the switching cycle.

19. A synchronous switching regulator comparison circuit for use in a switching regulator, the comparison circuit comprising a voltage offset that is used at least in part to compensate for a propagation delay of the comparison circuit, the switching regulator comprising an inductor and a synchronous transistor, the comparison circuit comprising:
- a delay circuit that provides a threshold amount of delay;
- a first offset adjustment loop that decreases the voltage offset of the comparison circuit when a synchronous transistor control signal transitions to an OFF state more than the threshold amount of delay prior to the discharge of an inductor; and
- a second offset adjustment loop that increases the voltage offset of the comparison circuit when the synchronous control signal transitions to an OFF state more than the threshold amount of delay following the discharge of the inductor.

* * * * *